United States Patent
Nottbrock

(10) Patent No.: US 10,775,864 B2
(45) Date of Patent: Sep. 15, 2020

(54) STORAGE OPERATING DEVICE AND METHOD FOR CONTROLLING A STORAGE OPERATING DEVICE

(71) Applicant: Lenze Drives GmbH, Extertal (DE)

(72) Inventor: Thomas Nottbrock, Detmold (DE)

(73) Assignee: Lenze Drives GmbH, Extertal (DE)

( * ) Notice: Subject to any disclaimer, the term of this patent is extended or adjusted under 35 U.S.C. 154(b) by 476 days.

(21) Appl. No.: 15/674,760

(22) Filed: Aug. 11, 2017

(65) Prior Publication Data

US 2018/0059760 A1 Mar. 1, 2018

(30) Foreign Application Priority Data

Aug. 29, 2016 (DE) .................... 10 2016 010 327

(51) Int. Cl.
| | | |
|---|---|---|
| *G06F 1/30* | (2006.01) | |
| *G05B 9/02* | (2006.01) | |
| *B66F 9/07* | (2006.01) | |
| *G06F 11/07* | (2006.01) | |
| *G06F 11/30* | (2006.01) | |

(52) U.S. Cl.
CPC ............... *G06F 1/30* (2013.01); *B66F 9/07* (2013.01); *G05B 9/02* (2013.01); *G06F 11/0727* (2013.01); *G06F 11/0793* (2013.01); *G06F 11/0796* (2013.01); *G06F 11/3062* (2013.01)

(58) Field of Classification Search
CPC .... G06F 1/30; G06F 11/0727; G06F 11/0793; G06F 11/0796; G06F 11/3062; B66F 9/07; G05B 9/02
See application file for complete search history.

(56) References Cited

U.S. PATENT DOCUMENTS

| | | | | |
|---|---|---|---|---|
| 5,917,297 A | * | 6/1999 | Gerster ............... | F16C 32/0442 318/366 |
| 9,893,674 B2 | * | 2/2018 | Ikai .................... | B23Q 5/58 |
| 2006/0129374 A1 | * | 6/2006 | Larson ................ | G06F 11/261 703/25 |
| 2009/0278511 A1 | * | 11/2009 | Benesch ............. | H02J 3/1892 323/207 |
| 2012/0043817 A1 | * | 2/2012 | Hartwig .............. | H02M 5/4505 307/73 |

(Continued)

FOREIGN PATENT DOCUMENTS

| | | | | |
|---|---|---|---|---|
| DE | 102014220165 A1 | | 4/2016 | |
| WO | WO-2015104825 A1 | * | 7/2015 | ............ H02M 7/003 |

*Primary Examiner* — Paul Contino
(74) *Attorney, Agent, or Firm* — Laurence P. Colton; Smith Tempel Blaha LLC

(57) ABSTRACT

A storage operating device equipped with a drive that is supplied with electrical energy from a power supply network via an inverter, the inverter having an electrical intermediate circuit, the storage operating device having a control device that is designed to detect a power failure and to react to the same. In order to create a storage operating device and a method for controlling a storage operating device that allows a guided stoppage of the storage operating device in the event of a failure of an electrical power supply network, at a lower cost than is the case in the prior art, the control device has means for detecting a power failure of the power supply network, for the purpose of monitoring the intermediate circuit voltage in the intermediate circuit.

8 Claims, 3 Drawing Sheets

(56) References Cited

U.S. PATENT DOCUMENTS

2016/0028331 A1\* 1/2016 Hashimoto ........... H02P 29/025
  318/479
2016/0226410 A1\* 8/2016 Lopez De Arroyabe ....................
  B60L 3/00

\* cited by examiner

Fig. 1, SdT

STORAGE OPERATING DEVICE AND METHOD FOR CONTROLLING A STORAGE OPERATING DEVICE

STATEMENT OF RELATED APPLICATIONS

This patent application is based on and claims the benefit of German Patent Application No. 10 2016 010 327.2 having a filing date of 29 Aug. 2016.

BACKGROUND OF THE INVENTION

Technical Field

The invention relates to a storage operating device and a method for controlling a storage operating device according to the preamble of the independent claims.

Prior Art

Storage operating devices of the type in question are devices with the function of stocking or retrieving goods in storage devices. These storage operating devices are typically installed permanently in the storage device, and have both stationary components—such as rail systems, for example—and movable components, such as manipulators, to pick up the goods being stocked and/or retrieved. Storage control devices of the type in question are supplied with electrical energy from a permanently installed power supply network. Depending on the structural design, these storage operating devices have one drive or a plurality of drives which produce the movements of the storage operating device. These drives are typically supplied with power from the power supply network by means of an inverter. These inverters have an intermediate electrical circuit which, during operation of the storage operating device, carries a direct voltage, the intermediate circuit voltage.

In the case of storage operating devices of the type in question, it is necessary, in particular for safety reasons, to stop the movements of the storage operating device when the electrical power supply by the power supply network fails. For this purpose, electromechanical brakes are commonly used, braking the movement of the storage operating device in the event of a power supply failure, and preferably fixing the same in its current position after the braking. Preferably, brakes are used which are designed in such a way that they close when their power supply fails. This approach ensures that, in the event of a power supply failure, the storage operating device comes to a standstill.

However, the braking processes in this case are relatively abrupt, and thus lead to increased wear on the brakes and other mechanical components of the storage operating device, such as, for example, rollers or drive wheels, or other components of the storage operating device. In the worst case, the storage operating device may be damaged.

In order to prevent this, the practice is therefore known in the prior art of configuring storage control devices of the type in question with a control device which is capable of recognizing and reacting to a power failure. In the event of a power failure, such a control device can effect a so-called guided stoppage of the storage operating device—that is, a controlled deceleration of the storage operating device. In this case, the drives are typically used to slow down the movements of the storage operating device so that the brakes of the storage operating device have to be closed only after the storage operating device and/or the drives of the storage operating device have reached a low speed, or have come to a complete standstill.

However, in order to achieve such a guided stoppage, electrical energy is still required for the duration of this process to supply the drive. According to the prior art, the energy can be made available by equipping the storage operating device with corresponding energy storage devices which prevent the typical sudden discharge of the intermediate circuit, such that energy is still available for the drives. For this purpose, DE 10 2014 220 165 A1 discloses energy storage devices which are connected to the electrical intermediate circuit, in the form of so-called supercapacitors.

The disadvantage of such a solution is the high costs resulting from the use of such energy storage devices. These costs result, on the one hand, from the capacitors themselves, and on the other hand from the additional power supply electronics required by the use of such supercapacitors.

BRIEF SUMMARY OF THE INVENTION

It is therefore the object of the invention to realize, at lower cost than is the case in the prior art, a storage operating device and a method for controlling a storage operating device which enable a guided stoppage of the storage operating device in the event of a failure of an electrical power supply network.

The object is achieved by a storage operating device and a method for controlling the storage operating device having the features of the independent claims. The features of the dependent claims relate to advantageous embodiments.

According to the invention, the object is achieved in that the storage operating device has a control device which has means for monitoring the voltage in the intermediate circuit to detect a power failure. According to the method according to the invention, the control device monitors the voltage of the intermediate circuit of the inverter, and uses this to detect power failures.

Surprisingly, it has been shown that the abrupt drop in the voltage in the intermediate circuit can be used as an indicator. This makes it possible to react to a power failure so quickly that it is possible to enable a guided stoppage, in particular by using a generator functionality of the drive, without the need to continue to supply the drive with electrical energy.

In the prior art, when the power supply network fails, the intermediate circuit usually discharges within a few milliseconds. For the method according to the invention, therefore, a rapid detection of the power failure and a rapid reaction to this power failure are essential, particularly to prevent the complete discharge of the intermediate circuit and thus the loss of guidance of the drives.

The power failure is advantageously detected by using the moment when the intermediate circuit voltage falls below a threshold value to detect a power failure. For this purpose, it is advantageous to have the most accurate possible knowledge of the instantaneous value of the intermediate circuit voltage—that is, an unsmoothed actual voltage in the intermediate circuit is preferably measured and compared to the threshold value. If the voltage drops below the threshold value, this is identified by the control device as a power failure, and the corresponding, predetermined reaction of the control device to the power failure is triggered.

The manner of the reaction to the power failure once detected preferably depends on the specific operating state of the storage operating device and/or of the specific drive of the storage operating device. In general, the storage operating device and/or the specific drive may be in an operating mode in which electrical energy is converted into mechanical energy (motor function). However, if a drive is used to slow down the storage operating device, it converts mechanical energy into electrical energy (generator function).

There are also operating states in which the operation is in the so-called storage control mode—that is, a specific position of the storage operating device is maintained by applying a drive torque, the storage drive likewise requiring a certain amount of electrical energy. This operating phase, however, is comparatively uncritical with regard to the stopping process, since in this case the lack of any movement which must initially be slowed down results in the immediate initiation of the brake of the storage operating device, without the disadvantageous effects described at the outset occurring as a result of the braking of the movement of the storage operating device.

Preferably, a predetermined fraction of a reference voltage, for example 95%, serves as a threshold value, preferably determined continuously by the control device during the operation of the storage operating device. The reference voltage is preferably also determined from the voltage of the intermediate circuit. The voltage is preferably smoothed for this purpose, for example by the use of a PT1 filter. A delay element, preferably first-order, is preferably used to accomplish the smoothing, with time constants which are ideally selected such that the smoothed reference voltage can follow the fluctuations in the power grid voltage occurring in practice, as well as the fluctuations of the voltage of the intermediate circuit caused by these fluctuations, whereas the abrupt drops in the intermediate circuit voltage due to power failures persist in having largely no effect on the reference voltage, at least up to the detection of the power failure.

It is also advantageous to limit the reference voltage with an upper reference voltage limit. When the drive is performing the generator function, it is possible for the intermediate circuit voltage to exceed the intermediate circuit voltage that can be generated by the power supply network. In this context, operating states are possible in which the intermediate circuit voltage drops back from such an excessive intermediate circuit voltage to the intermediate circuit voltage produced by the grid—for example, after a generative braking of a movement by the drive—without a power failure occurring. The limitation of the reference voltage to a suitable reference voltage limit can prevent the erroneous detection of power failures in such operating states.

Advantageously, the control device reacts, when a power failure is detected, particularly in a motor operating phase of the drive, by switching the storage operating device into a generator operating phase of the drive. This switch into the generator operating phase has the advantage, first, that the movement of the storage operating device can be slowed down via the drive as a result of the generator function of the drive. Particularly with regard to the present invention, however, it has the advantage of preventing the interruption of the intermediate circuit voltage and its discharge, since the intermediate circuit can now be fed the electrical energy generated by the drive.

The switch preferably occurs in the fastest possible way, particularly in a manner whereby a rotation speed control of the drive, based on the presetting and adjustment of rotation speed setpoints, is at least largely bypassed. Instead, a pilot control value for the drive torque is set directly. This pilot control value can, for example, be stored in a data memory of the accordingly programmed control device and, in the event of a power failure, can be recalled by the control device and can be directly applied, particularly in a manner which bypasses any control circuit. This makes it possible to bypass comparatively time-intensive control processes.

On the one hand, it is possible to set the motor torque to zero at first, such that the drive passes directly into the generator function due to the inertia of the movement. On the other hand, for an even faster and more effective triggering of the switching process, a starting value for a generator drive torque can be set directly. In this case, it is advantageous to set an excessively high value for the generator drive torque, which is subsequently lowered again (torque boost).

It should be understood in this context that the above-described switch from a motor function to a generator function can be dispensed with if the power failure occurs during a generator operating phase of the drive. During such a generator operating phase and/or after the switching to a generator operating phase, after the detection of a power failure, the control device preferably performs a deceleration of the movement of the storage operating device, by means of the drive.

For the deceleration using the generator function of the drive, it is advantageous if the drive torque, which in this case acts in a braking manner, increases over time—for example, in a ramp. This can also be realized by a prespecified profile of stored control values which are transmitted by the control device to the drive. Alternatively, it is also possible, to control this deceleration phase, to access a control—specifically a rotation speed control—which was optionally bypassed earlier, particularly during the switching process.

It may be advantageous to use the energy generated by the drive in its generator function and supplied to the intermediate circuit in order to supply power to the control device and/or preferably supply voltage to the electromechanical brake of the storage operating device. For this purpose, the storage operating device preferably has a power supply device fed from the intermediate circuit. This can be, for example, a wide-range power supply which can thereby supply power to the control device and/or brakes of the storage operating device until the end of the guided stoppage of the storage operating device.

The installation of a conventional uninterruptible power supply, particularly in the stationary part of the storage operating device, is also advantageous. A braking resistor is also advantageous, in order to convert excess electrical energy produced during the generator function of the drive into heat energy if a feedback of this electrical energy is no longer possible in the event of a power failure.

The control device is preferably designed in such a way that it activates the brake of the storage operating device after the detection of a power failure—that is, particularly, closes as soon as a prespecifiable threshold speed of the storage operating device is exceeded. To achieve a particularly gentle deceleration of the storage operating device, it is particularly advantageous if the brake engages once the standstill point of the movement which is slowed down by the drive in the generator function is reached. In practice, however, even just a drop below a certain threshold speed may be sufficient, wherein below this threshold an abrupt braking of the residual movement by the engaging brake can be regarded as uncritical with regard to the mechanical loads of the storage operating device. If the power failure is detected in the storage control mode—that is, if the storage operating device is held in a specific position by the drive— then the brake is advantageously activated directly by the control device in order to immediately halt the storage operating device in this same position. A slight "settlement" of the storage operating device possibly held by the drive, until the final stop by the brake, can be tolerated in this case.

In the manner described above, it is then possible to guide the storage operating device to a stop without the need for cost-intensive energy storage devices for supplying the drives themselves. The advantageous, optionally included energy storage devices—specifically an optionally included uninterruptible power supply—need only supply power until the final standstill of the storage operating device to the auxiliary systems necessary for controlling the drives—that is, the control device itself, the electromechanical brake, and optionally present memory-programmable controls, safety and/or fieldbus systems, etc. However, only a fraction of the electrical power required according to the prior art described above is required in order to supply the drives themselves with the required electrical energy. In particular, this means that only small and low-cost components, such as, for example, a 24-V uninterruptible power supply, are required. There is no need for cost-intensive devices for the provision of high electrical power—such as, for example, the supercapacitors described at the outset.

BRIEF DESCRIPTION OF THE DRAWINGS

The invention is explained in more detail below with reference to FIGS. 1 to 3.

DETAILED DESCRIPTION OF PREFERRED EMBODIMENTS

In the measurements shown in the figures, the measured values are indicated as dimensionless relative values for each reference value. The absolute readings are not essential to the understanding of the present invention. For this reason, for the individual measured parameters with corresponding reference values, relative measured values were formed so as to be able to represent the individual data profiles graphically in a meaningful manner with a common scaling.

Figure 1:
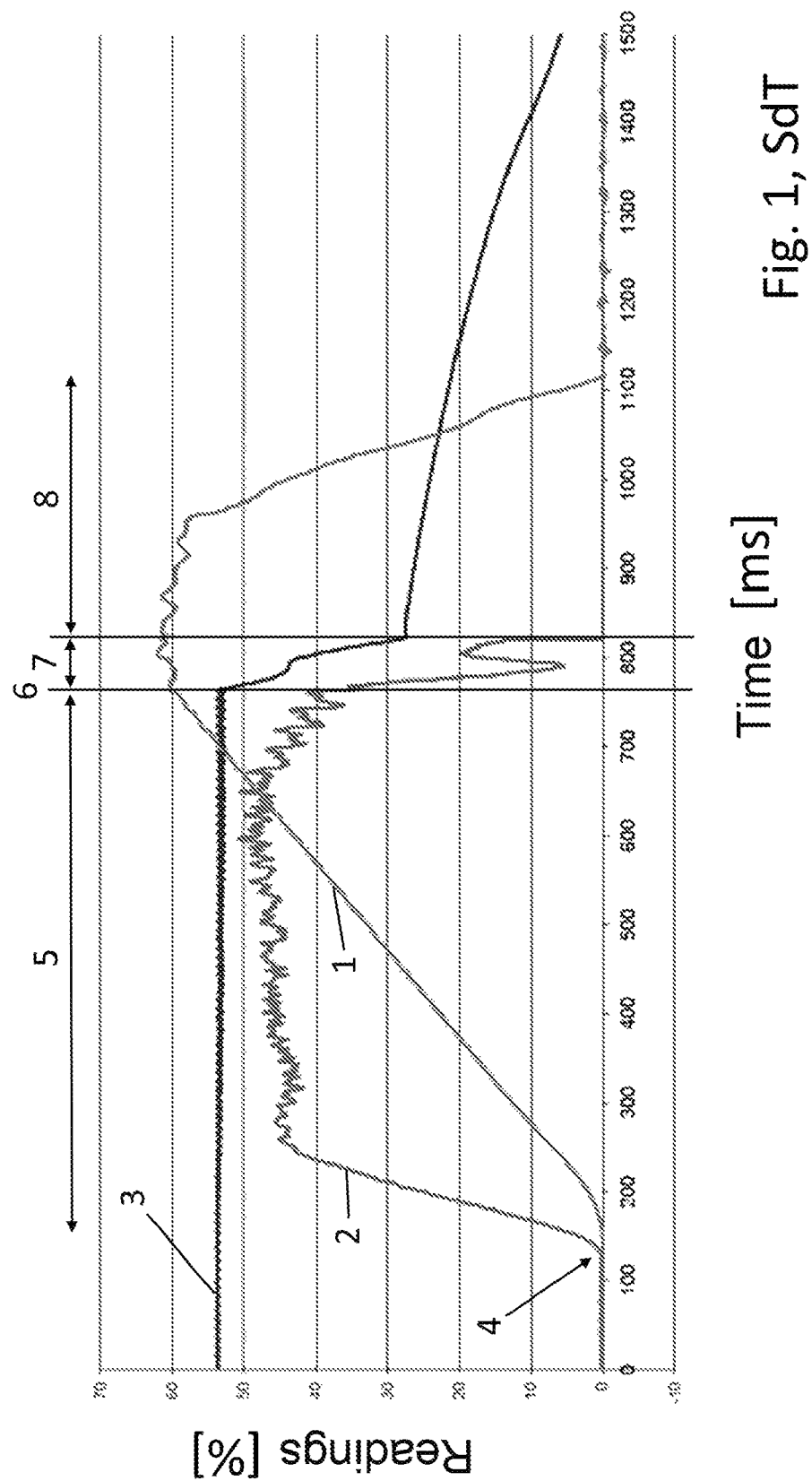
FIG. 1 shows exemplary measured profiles of drive torque, intermediate circuit voltage, and movement speed of an exemplary storage operating device according to the prior art, in the event of a power failure.
Figure 2:
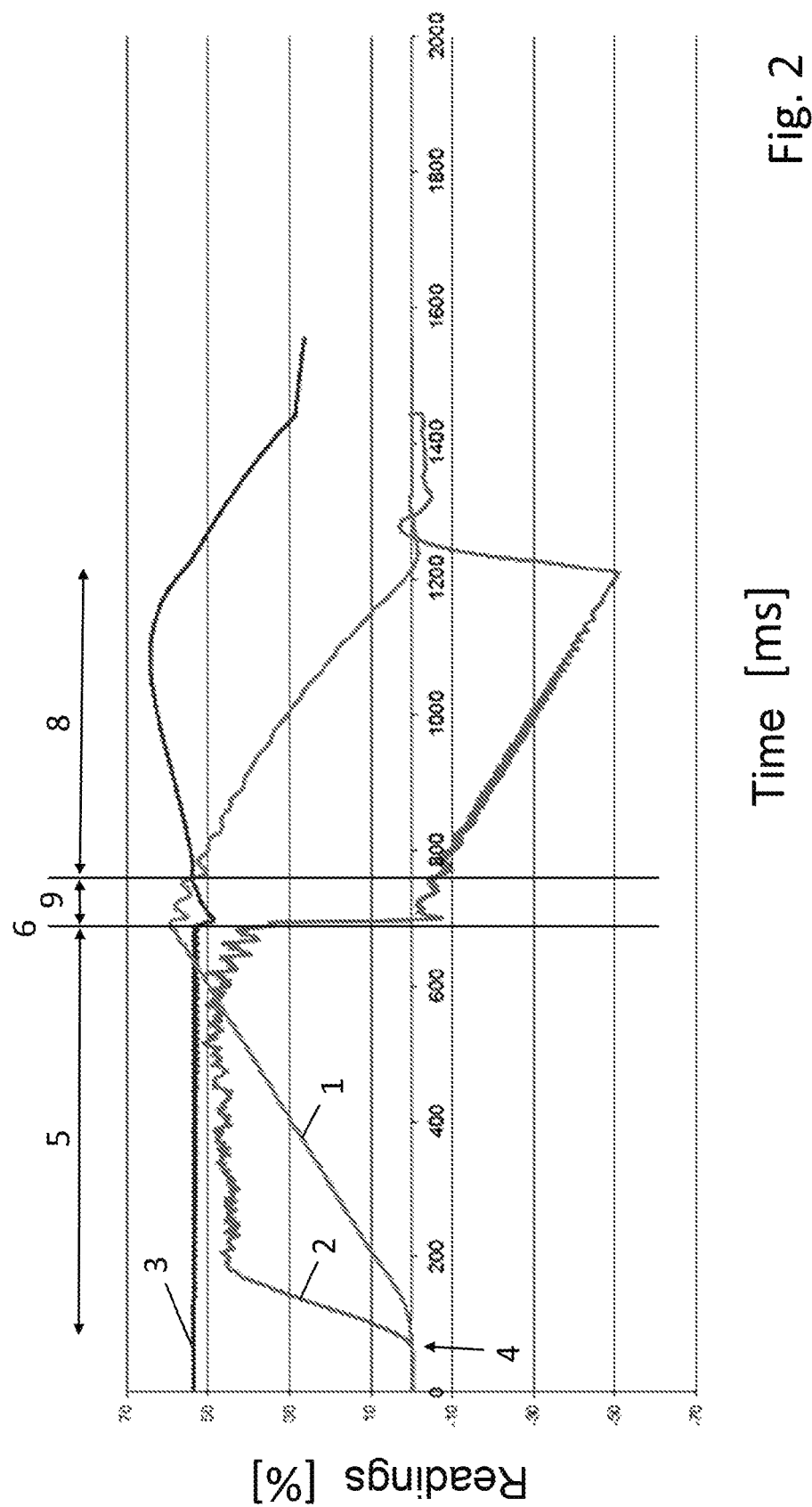
FIG. 2 shows corresponding measurement data when a method according to the invention is carried out for controlling the storage operating device.
Figure 3:
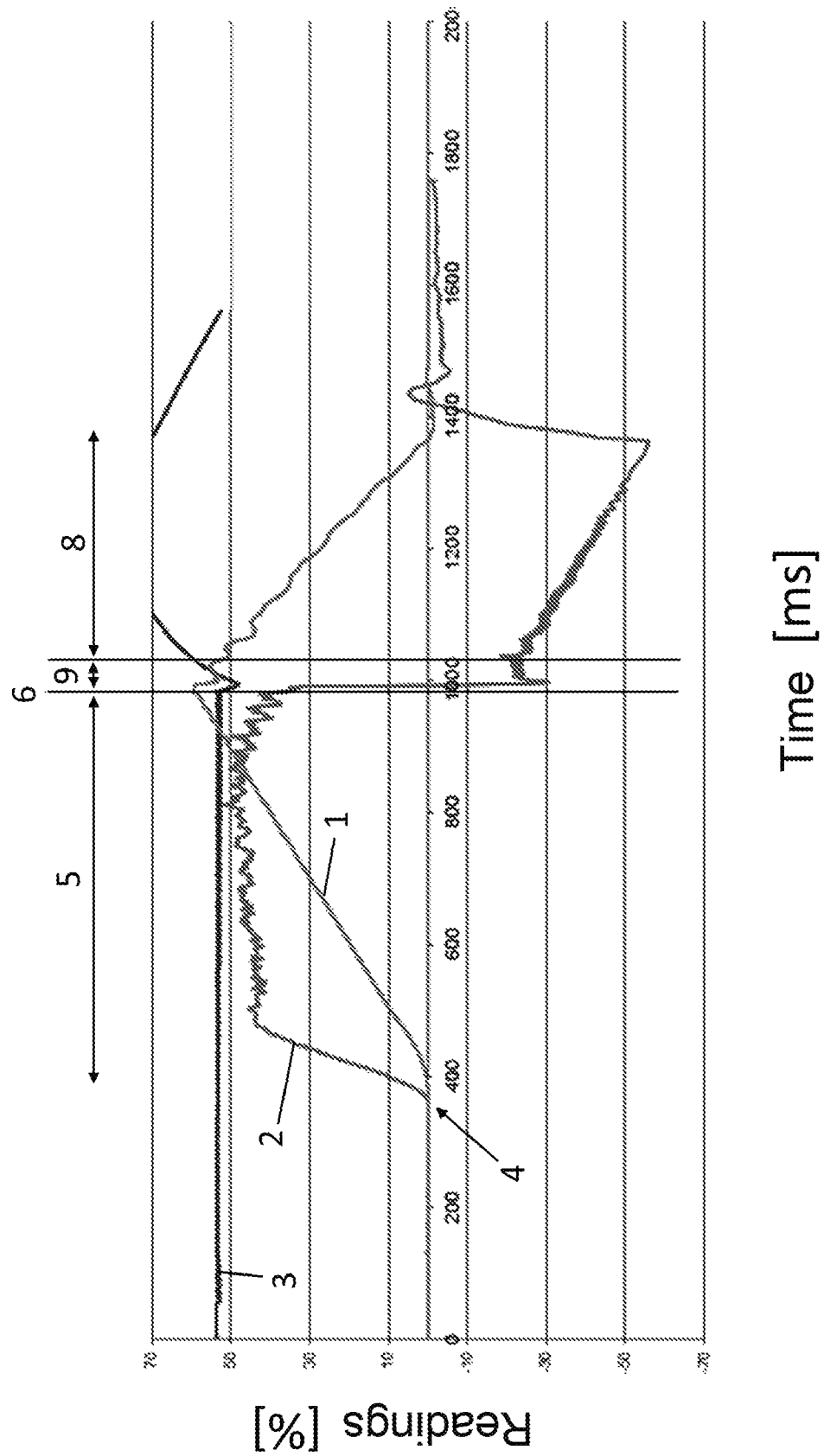
FIG. 3 shows corresponding measurement data when an alternative method according to the invention is carried out, with a pilot control value for the drive torque which is briefly in excess.

FIGS. 1 to 3 show the profiles of the drive speed 1, the drive torque 2 and the intermediate circuit voltage 3 of a storage operating device, respectively.

FIG. 1 is an exemplary storage operating device according to the prior art, which is stopped and/or slowed down in a conventional manner. At the beginning of the measurement, the voltage in the intermediate circuit shows the value typical for failure-free power grid operation. At the beginning of the grid failure test shown in FIG. 1, starting from starting time 4, the drive passes through an acceleration phase 5, in which the drive speed 1 increases as the intermediate circuit voltage 3 remains constant. The drive torque 2 also initially rises in order to reach a value which is largely constant after a short time, within the range of technical fluctuations.

At the time of the power failure 6, the profile of all three measured parameters changes significantly. During the short phase 7 period immediately after the moment the power grid fails, the intermediate circuit voltage 3 drops to a residual voltage value as a result of the discharge of the intermediate circuit. After this abrupt voltage drop, essentially no energy can be fed into the drive from the intermediate circuit, which is expressed by the fact that the drive torque 2 drops to zero during the power failure phase 7. The movement speed of the drive does not increase further after the power failure, initially remaining approximately constant in the illustrated example, within the range of measurement accuracy fluctuations. This is due to the inertia of the moving mechanical system.

The braking phase 8 follows the power failure phase 7. In this phase, there is no measurable drive torque 2 in effect. The intermediate circuit voltage 3 further gradually dissipates from a residual voltage value which is no longer sufficient to supply the drive. The drive speed 1 initially remains relatively constant due to the inertia, until the brake of the storage operating device, which has been activated as a result of the power failure detected by conventional methods, closes and causes a comparatively steep drop in the drive speed 1 to zero as a result of the braking action. In the example shown, approx. 150 ms elapse from the application of the braking function to the halt of the drive.

FIG. 2 shows the corresponding parameter profiles for a power failure test with a storage operating device according to the invention. In the power failure test shown in FIG. 2, the method according to the invention is used to control the storage operating device. The profile of the three measured parameters, drive speed 1, drive torque 2 and intermediate circuit voltage 3 after the start time 4—that is, the time at which the drive is started—corresponds at least substantially to the profiles of the parameter values shown in FIG. 1. Starting at the moment of the power failure 5, however, the measured parameters behave completely differently from those of the prior art shown in FIG. 1.

A reaction phase 9 proceeds from the moment of the power failure 6 in the example shown. In this reaction phase, the control device advantageously implements a switching of the drive when the power failure is detected. This is implemented advantageously in the illustrated example by the fact that the drive torque 2 is first set to a pilot control value of zero, and the drive is switched from a motor operating phase to a generator operating phase. The generator drive torque 2—which can be recognized in FIG. 2 by the negative sign—is subsequently increased in the form of a ramp in the example shown.

As a result of the rapid switching of the drive into the generator function, the intermediate circuit voltage 3 drops only minimally before it is stabilized again by the energy fed back by the drive. From the moment of the switching, a phase of steady decline in drive speed 1 starts as a result of the switching. The intermediate circuit voltage 3 in this phase is maintained by the electrical energy fed back by the drive operated as a generator. In the illustrated example, an intermediate circuit voltage 3 is achieved which is actually above the level of the intermediate circuit voltage 3 during power grid operation.

The drive speed 1 of the drive thus begins to fall immediately after the moment of the power failure. In the example shown, the drive speed 1 and thus the movement speed of the storage operating device is reduced to approximately zero over a period of approximately 500 ms. This approach achieves a significantly smoother stoppage of the storage operating device than does the prior art illustrated in FIG. 1.

In the case of the further advantageous embodiment illustrated in FIG. 3, the method described in FIG. 2 is used in an advantageous variant in which the switching is advantageously implemented by setting a predefined pilot control value for the drive torque, which already corresponds to a defined braking torque when the drive is operated as a generator. This can be recognized in FIG. 3 by the fact that, immediately after the moment of the power failure 6, the drive torque 2 is set for an extremely short period of time to an excess pilot control value of 30%, which corresponds to a significant braking torque.

Immediately thereafter, the drive torque 2, which is generative and/or braking, is set to the starting value of a ramp in the example shown. This starting value corresponds to a lower brake torque than the excess pilot control value. Thereafter, the braking torque is again increased up until a halt of the drive and/or of the storage operating device, similarly to the manner described in FIG. 2.

In this case, the storage operating device comes to a halt within a period of approximately 400 ms—that is, the duration of the delay process is shortened by the briefly excessive pilot control value (and the resulting torque boost) as a result of the faster recommutation. At the same time, primarily at the beginning of the generator function braking process, more electrical energy is fed back from the drive into the intermediate circuit immediately after the moment of the power failure 6—that is, at the beginning of the reaction phase—than in the case of the method variant shown in FIG. 2.

LIST OF REFERENCE NUMBERS 1 drive speed
2 drive torque
3 intermediate circuit voltage
4 start time
5 acceleration phase
6 moment of power failure
7 phase immediately after power failure
8 braking phase
9 reaction phase

What is claimed is:

1. A control device for a storage operating device, the storage operating device having a drive which is supplied with electrical energy from a power supply network by an inverter, the inverter comprising an electrical intermediate circuit, and the control device being designed to detect a power failure and to react to the power failure,
the control device comprising means for monitoring the intermediate circuit voltage in the intermediate circuit and means for smoothing the intermediate circuit voltage and using the intermediate circuit voltage to detect the power failure of the power supply network, whereby (a) the power failure is detected by the intermediate circuit voltage dropping below a threshold value, the intermediate circuit voltage being non-smoothed for this purpose, and (b) the threshold value being formed during the operation of the storage operating device from a reference voltage that is obtained from the intermediate circuit voltage, the intermediate circuit voltage being smoothed for this purpose by the means for smoothing.

2. The storage operating device according to claim 1, wherein
the storage operating device comprises a wide-range power supply, supplied from the intermediate circuit, for supplying the control device and/or an electromechanical brake of the storage operating device with electrical energy.

3. A method for controlling a storage operating device, wherein a control device detects a power failure during the operation of the storage operating device and reacts to the power failure,
comprising
monitoring the intermediate circuit voltage of an intermediate circuit of an inverter with the control device and using the intermediate circuit voltage to detect the power failure;
detecting the power failure by the intermediate circuit voltage dropping below a threshold value, the intermediate circuit voltage being non-smoothed; and
forming the threshold value during the operation of the storage operating device from a reference voltage that is obtained from the intermediate circuit voltage, the intermediate circuit voltage being smoothed.

4. The method according to claim 3, wherein
the value of the reference voltage is limited to an upper reference voltage limit.

5. The method according to claim 3, wherein
the control device, when the power failure is detected during an operating phase in which the drive converts electrical energy into mechanical energy, switches the storage operating device into an operating phase in which the drive converts mechanical energy into electrical energy.

6. The method according to claim 5, wherein
the switching, implemented in a manner which bypasses a rotation speed control, results from the setting of a pilot control value for a drive torque, wherein the pilot control value can be recalled from a data memory by the control device, wherein an excess value is set for a short time, and is then lowered subsequently.

7. The method according to claim 5, wherein
the control device, upon the detection, during and/or after the switching into an operating phase in which the drive converts mechanical energy into electrical energy, slows down the movement of the storage operating device by the drive, with a drive torque which increases in a time-dependent manner.

8. The method according to claim 3 wherein
the control device activates a brake of the storage operating device after the power failure has been detected, as soon as the speed of the storage operating device drops below a prespecifiable threshold speed.

* * * * *